United States Patent
Campbell

(10) Patent No.: US 9,808,842 B2
(45) Date of Patent: Nov. 7, 2017

(54) GAS EVACUATION SYSTEM WITH COUNTER

(75) Inventor: Michael C. Campbell, Virginia Beach, VA (US)

(73) Assignee: JUSTRITE MANUFACTURING COMPANY, L.L.C., Des Plaines, IL (US)

( * ) Notice: Subject to any disclaimer, the term of this patent is extended or adjusted under 35 U.S.C. 154(b) by 671 days.

(21) Appl. No.: 13/212,346

(22) Filed: Aug. 18, 2011

(65) Prior Publication Data

US 2013/0042944 A1    Feb. 21, 2013

(51) Int. Cl.
*B09B 3/00* (2006.01)
*B65B 31/04* (2006.01)

(52) U.S. Cl.
CPC ........ *B09B 3/0058* (2013.01); *B09B 2220/02* (2013.01)

(58) Field of Classification Search
CPC ............. B67B 7/00; B09B 3/00; B65B 31/04
USPC ................. 141/65, 69, 94, 329, 330; 222/5; 414/412
See application file for complete search history.

(56) References Cited

U.S. PATENT DOCUMENTS

| | | |
|---|---|---|
| 1,242,873 A | 10/1917 | Wilhelm Schroeder |
| 1,555,759 A | 9/1925 | Rowe |
| 1,586,298 A | 5/1926 | Eaton |
| 1,599,685 A | 9/1926 | Spaeth |
| 1,718,985 A | 7/1929 | Scoville |
| 2,014,187 A | 9/1935 | Neff |
| 2,553,942 A | 5/1951 | Roos |
| 2,569,319 A | 9/1951 | Krug |

(Continued)

FOREIGN PATENT DOCUMENTS

| | | |
|---|---|---|
| CN | 105312302 A | 2/2016 |
| DE | 1607991 A1 | 10/1970 |

(Continued)

OTHER PUBLICATIONS

U.S. Appl. No. 29/547,478, filed Dec. 3, 2015.

(Continued)

*Primary Examiner* — Timothy L Maust
*Assistant Examiner* — Andrew Schmid
(74) *Attorney, Agent, or Firm* — Leydig, Voit & Mayer, Ltd.

(57) ABSTRACT

A puncturing device for pressurized containers comprises an elongated housing defining an elongated cavity with openings at either end for receiving an inverted pressurized container at one end, the housing including a selective attachment member for securing the other end of the housing to a collection receptacle. A non-sparking puncturing apparatus, with a lever having a built-in stop, is movably mounted on the housing with a pivot-link-driven puncture pin extending through an intermediate aperture into the cavity for piercing a nozzle-end of the pressurized container below an internal shoulder thereof with a seal. A counter records each action of the puncture pin. Container contents are released into the receptacle. An auxiliary support is rotatably mounted on the housing for stabilizing relative movement between the housing and the receptacle. A force-applying apparatus is mounted on the housing for engaging the pressurized container and holding it on the seal.

20 Claims, 5 Drawing Sheets

(56) References Cited

U.S. PATENT DOCUMENTS

| | | | |
|---|---|---|---|
| 2,778,223 A | 11/1953 | Kimbrell | |
| 2,671,528 A | 3/1954 | Gross | |
| 2,851,768 A | 9/1958 | Ellis | |
| D186,589 S | 6/1959 | Allen | |
| 3,157,107 A | 11/1964 | Kosar | |
| 3,169,665 A | 2/1965 | Colley | |
| 3,303,968 A | 2/1967 | Compere | |
| 3,333,735 A | 8/1967 | Odasso | |
| 3,358,883 A | 12/1967 | Loe | |
| 3,43,0819 A | 3/1969 | Moonan | |
| 3,438,548 A | 4/1969 | Ceyba | |
| 3,828,976 A | 8/1974 | Sidelinker | |
| 3,834,589 A | 9/1974 | Morane et al. | |
| 3,840,967 A | 10/1974 | Olson | |
| 3,891,417 A | 6/1975 | Wade | |
| 3,926,340 A | 12/1975 | Tygenhof | |
| 4,071,012 A | 1/1978 | Cooke | |
| 4,223,799 A | 9/1980 | Eyster et al. | |
| 4,252,547 A | 2/1981 | Johnson | |
| D266,188 S | 9/1982 | Seeley et al. | |
| 4,349,054 A | 9/1982 | Chipman et al. | |
| 4,407,341 A | 10/1983 | Feldt et al. | |
| 4,420,012 A | 12/1983 | Astrom | |
| 4,426,863 A | 1/1984 | Gillette et al. | |
| 4,459,906 A | 7/1984 | Cound et al. | |
| 4,500,015 A | 2/1985 | Penney | |
| 4,580,700 A | 4/1986 | Rush | |
| 4,620,576 A * | 11/1986 | Owen, Jr. | 141/1 |
| 4,655,060 A | 4/1987 | Jakubas | |
| 4,699,190 A | 10/1987 | Bates | |
| 4,700,866 A | 10/1987 | Taylor | |
| 4,705,082 A | 11/1987 | Fanshaw et al. | |
| 4,742,688 A | 5/1988 | Rubin | |
| 4,782,597 A | 11/1988 | Mills | |
| 4,788,840 A | 12/1988 | Wilson, Jr. | |
| 4,811,977 A | 3/1989 | Swift et al. | |
| 4,834,267 A | 5/1989 | Schroer et al. | |
| 4,934,055 A | 6/1990 | Chambers | |
| 4,959,980 A | 10/1990 | Phillips | |
| 4,968,333 A | 11/1990 | Ellis et al. | |
| 5,002,593 A | 3/1991 | Ichishita et al. | |
| 5,067,529 A | 11/1991 | Gonzalez-Miller et al. | |
| 5,086,814 A | 2/1992 | Sato et al. | |
| 5,088,526 A * | 2/1992 | Nash | 141/1 |
| 5,114,043 A * | 5/1992 | Collins, Jr. | 222/86 |
| 5,125,700 A | 6/1992 | Fattori et al. | |
| 5,141,656 A | 8/1992 | Rountree | |
| 5,163,585 A * | 11/1992 | Campbell | 222/5 |
| 5,181,462 A | 1/1993 | Isaac | |
| 5,188,155 A | 2/1993 | Kremer | |
| 5,199,286 A | 4/1993 | Jakubas | |
| 5,265,762 A * | 11/1993 | Campbell et al. | 222/5 |
| 5,271,437 A * | 12/1993 | O'Brien et al. | 141/51 |
| 5,284,997 A | 2/1994 | Spearman et al. | |
| 5,285,827 A | 2/1994 | Gonzalez-Miller et al. | |
| 5,303,749 A | 4/1994 | Stock et al. | |
| 5,309,956 A | 5/1994 | Hajma | |
| 5,322,093 A | 6/1994 | O'Neil | |
| 5,332,009 A | 7/1994 | VanEtten | |
| 5,337,503 A | 8/1994 | Goby | |
| 5,339,876 A | 8/1994 | Mattern | |
| 5,341,853 A * | 8/1994 | Nugues et al. | 141/7 |
| 5,351,859 A | 10/1994 | Jansen | |
| 5,365,982 A | 11/1994 | O'Neill | |
| 5,370,268 A * | 12/1994 | Adams | 222/1 |
| 5,383,498 A | 1/1995 | Mattern et al. | |
| 5,385,177 A | 1/1995 | O'Neil | |
| 5,421,380 A | 6/1995 | Campbell | |
| 5,427,157 A | 6/1995 | Nickens et al. | |
| 5,427,609 A | 6/1995 | Zoglman et al. | |
| 5,460,154 A | 10/1995 | Mattern et al. | |
| 5,465,473 A | 11/1995 | Teeslink | |
| 5,469,898 A * | 11/1995 | Campbell | 141/65 |
| 5,471,730 A | 12/1995 | Sackett | |
| 5,474,114 A | 12/1995 | Nickens et al. | |
| 5,499,665 A | 3/1996 | Gold et al. | |
| 5,499,945 A | 3/1996 | Ferlin et al. | |
| 5,524,945 A | 6/1996 | Georgopoulos et al. | |
| 5,529,097 A * | 6/1996 | Campbell | 141/51 |
| 5,533,767 A | 7/1996 | Georgopoulos et al. | |
| 5,535,730 A | 7/1996 | Mattern | |
| 5,546,995 A | 8/1996 | Van Etten | |
| 5,564,414 A * | 10/1996 | Walker et al. | 128/200.23 |
| 5,568,951 A | 10/1996 | Morgan | |
| 5,584,325 A | 12/1996 | Nickens et al. | |
| 5,596,892 A | 1/1997 | Edgar et al. | |
| 5,613,533 A | 3/1997 | Gold et al. | |
| 5,613,534 A | 3/1997 | Nickens et al. | |
| 5,615,715 A | 4/1997 | Yore | |
| 5,657,800 A | 8/1997 | Campbell | |
| D383,659 S | 9/1997 | Norman | |
| 5,664,610 A | 9/1997 | Nickens et al. | |
| 5,702,592 A | 12/1997 | Suri et al. | |
| 5,715,803 A | 2/1998 | Mattern | |
| 5,727,498 A | 3/1998 | Heckler et al. | |
| 5,740,615 A * | 4/1998 | Treske | 30/448 |
| 5,743,246 A | 4/1998 | Mattern | |
| 5,775,362 A | 7/1998 | Sato et al. | |
| 5,785,038 A | 7/1998 | Mattern | |
| 5,819,815 A | 10/1998 | Nickens et al. | |
| 5,823,236 A * | 10/1998 | Kirby et al. | 141/330 |
| 5,826,447 A | 10/1998 | Campbell | |
| 5,826,631 A * | 10/1998 | Gold et al. | 141/1 |
| 5,832,966 A | 11/1998 | Nickens et al. | |
| 5,868,174 A | 2/1999 | Mattern | |
| 5,900,216 A | 5/1999 | Nickens et al. | |
| 5,901,759 A * | 5/1999 | Nickens et al. | 141/51 |
| 5,918,649 A | 7/1999 | Johse | |
| 5,934,511 A | 8/1999 | Ausmus | |
| 5,957,168 A | 9/1999 | Nickens et al. | |
| 5,967,012 A | 10/1999 | Dummer et al. | |
| 5,979,709 A | 11/1999 | Liccioni | |
| 5,992,475 A * | 11/1999 | Campbell | 141/65 |
| 6,000,391 A | 12/1999 | Timmons | |
| 6,013,121 A | 1/2000 | Chiu et al. | |
| 6,041,506 A | 3/2000 | Iwao | |
| 6,053,362 A | 4/2000 | Lin | |
| 6,139,806 A | 10/2000 | Nickens et al. | |
| 6,164,344 A | 12/2000 | Nickens et al. | |
| 6,219,925 B1 | 4/2001 | Chen | |
| 6,240,981 B1 | 6/2001 | Nickens et al. | |
| D446,816 S | 8/2001 | Hsuan | |
| 6,308,746 B1 | 10/2001 | Nickens et al. | |
| 6,318,252 B1 | 11/2001 | Kao | |
| 6,331,141 B1 | 12/2001 | Chua | |
| 6,393,900 B1 | 5/2002 | Buckner, III et al. | |
| D458,308 S | 6/2002 | Hsuan | |
| 6,412,384 B1 | 7/2002 | Iwao | |
| 6,422,273 B1 * | 7/2002 | Campbell | 141/65 |
| 6,428,410 B1 | 8/2002 | Campbell | |
| 6,450,192 B1 | 9/2002 | Romanek | |
| 6,481,470 B1 * | 11/2002 | Rubenic | 141/329 |
| 6,644,515 B1 | 11/2003 | Campbell | |
| 6,709,221 B2 | 3/2004 | Roura Adell et al. | |
| 6,743,281 B1 | 6/2004 | Miller | |
| 6,810,731 B1 | 11/2004 | Lo | |
| 6,908,372 B2 | 6/2005 | Larsson | |
| 6,923,851 B1 | 8/2005 | Butler et al. | |
| 6,941,979 B1 | 9/2005 | Potts et al. | |
| 7,562,622 B2 | 7/2009 | Babiel et al. | |
| 7,690,130 B1 | 4/2010 | Risinger | |
| D632,318 S | 2/2011 | Sindlinger | |
| 7,930,947 B2 | 4/2011 | Counts | |
| 7,946,010 B1 | 5/2011 | Myers et al. | |
| D671,357 S | 11/2012 | Trombly | |
| D675,237 S | 1/2013 | Broadbent et al. | |
| D685,035 S | 6/2013 | Kanbar | |
| D690,332 S | 9/2013 | Morehead et al. | |
| 8,997,617 B2 | 4/2015 | Thomson | |
| D737,904 S | 9/2015 | Kuehne | |
| 9,314,661 B1 | 4/2016 | Chen | |
| D761,673 S | 7/2016 | Allen et al. | |
| 2002/0170861 A1 | 11/2002 | Monsrud et al. | |
| 2003/0027699 A1 | 2/2003 | Brodie et al. | |

(56) References Cited

U.S. PATENT DOCUMENTS

| | | |
|---|---|---|
| 2003/0189002 A1 | 10/2003 | Proulx et al. |
| 2004/0038096 A1 | 2/2004 | Chou et al. |
| 2004/0045424 A1 | 3/2004 | Ikeda et al. |
| 2006/0191422 A1 | 8/2006 | Dorion |
| 2007/0005072 A1 | 1/2007 | Castillo et al. |
| 2007/0068352 A1 | 3/2007 | Morgan |
| 2007/0180723 A1 | 8/2007 | Morgan |
| 2008/0173086 A1 | 7/2008 | McQuaid |
| 2008/0295562 A1 | 12/2008 | Straka |
| 2008/0314220 A1 | 12/2008 | Ferry et al. |
| 2009/0050121 A1 | 2/2009 | Holzmann et al. |
| 2009/0223032 A1 | 9/2009 | Huang et al. |
| 2010/0095815 A1 | 4/2010 | Laib et al. |
| 2011/0016733 A1 | 1/2011 | Peretti |
| 2011/0265655 A1 | 11/2011 | Schuster et al. |
| 2012/0024771 A1 | 2/2012 | Abdalla et al. |
| 2012/0094810 A1 | 4/2012 | Anderson |
| 2012/0121751 A1 | 5/2012 | Atagi et al. |
| 2012/0210689 A1 | 8/2012 | Rogers et al. |
| 2013/0042944 A1* | 2/2013 | Campbell ............... 141/65 |
| 2013/0109545 A1 | 5/2013 | Chen |
| 2013/0209338 A1 | 8/2013 | Prasad et al. |
| 2014/0018213 A1 | 1/2014 | Chen |
| 2014/0109742 A1 | 4/2014 | Elsmore et al. |
| 2014/0121075 A1 | 5/2014 | Brown |
| 2014/0162850 A1 | 6/2014 | Chen |
| 2014/0202375 A1 | 7/2014 | Goff |
| 2015/0273384 A1 | 10/2015 | Campbell |
| 2015/0298955 A1 | 10/2015 | Campbell |
| 2016/0325222 A1 | 11/2016 | Campbell |
| 2016/0338712 A1 | 11/2016 | Chernosky et al. |

FOREIGN PATENT DOCUMENTS

| | | |
|---|---|---|
| DE | 4204836 C2 | 8/1993 |
| DE | 19932519 A1 | 5/2001 |
| EP | 0417022 A1 | 3/1991 |
| EP | 0550815 A1 | 7/1993 |
| FR | 616328 A | 1/1927 |
| SU | 821399 A1 | 4/1981 |
| WO | WO 92/18418 A1 | 10/1992 |
| WO | WO 96/22916 A1 | 8/1995 |
| WO | WO 97/48475 | 12/1997 |
| WO | WO 00/05137 | 2/2000 |
| WO | WO 2009/156757 A1 | 12/2009 |

OTHER PUBLICATIONS

U.S. Appl. No. 29/546,867, filed Nov. 25, 2015.
U.S. Appl. No. 15/149,136, filed May 8, 2016.
U.S. Appl. No. 61/940,810, filed Feb. 17, 2014.
U.S. Appl. No. 61/973,374, filed Apr. 1, 2014.
U.S. Appl. No. 62/063,885, filed Oct. 14, 2014.
U.S. Appl. No. 62/158,928, filed May 8, 2015.
U.S. Appl. No. 29/547,478, filed Dec. 3, 2015, Michael C. Campbell.
U.S. Appl. No. 29/546,867, filed Nov. 25, 2015, Michael C. Campbell.
U.S. Appl. No. 15/149,136, filed May 8, 2016, Michael C. Campbell.
U.S. Appl. No. 61/940,810, filed Feb. 17, 2014, Michael C. Campbell.
U.S. Appl. No. 61/973,374, filed Apr. 1, 2014, Michael C. Campbell.
U.S. Appl. No. 62/063,885, filed Oct. 14, 2014, Michael C. Campbell.
U.S. Appl. No. 62/158,928, filed May 8, 2015, Michael C. Campbell.
TalkTools "Adult Straw with Blue Lip Block," http://www.talktools.com/adult-straw-with-blue-lip-block/ 1 p. (Oct. 7, 2016).
Aerosol Can Disposal, retrieved from https://www.americangasproducts.com/aerosol-can-disposal, 4 pages (Copyright 2015).
U.S. Patent and Trademark Office, International Search Report in International Application No. PCT/US1999/016418 (Nov. 4, 1999).
U.S. Patent and Trademark Office, International Search Report in International Application No. PCT/US2015/045366 (Nov. 24, 2015).
U.S. Patent and Trademark Office, International Search Report in International Application No. PCT/US2015/053416 (Dec. 30, 2015).
U.S. Patent and Trademark Office, International Search Report in International Application No. PCT/US2016/031396 (Aug. 11, 2016).

* cited by examiner

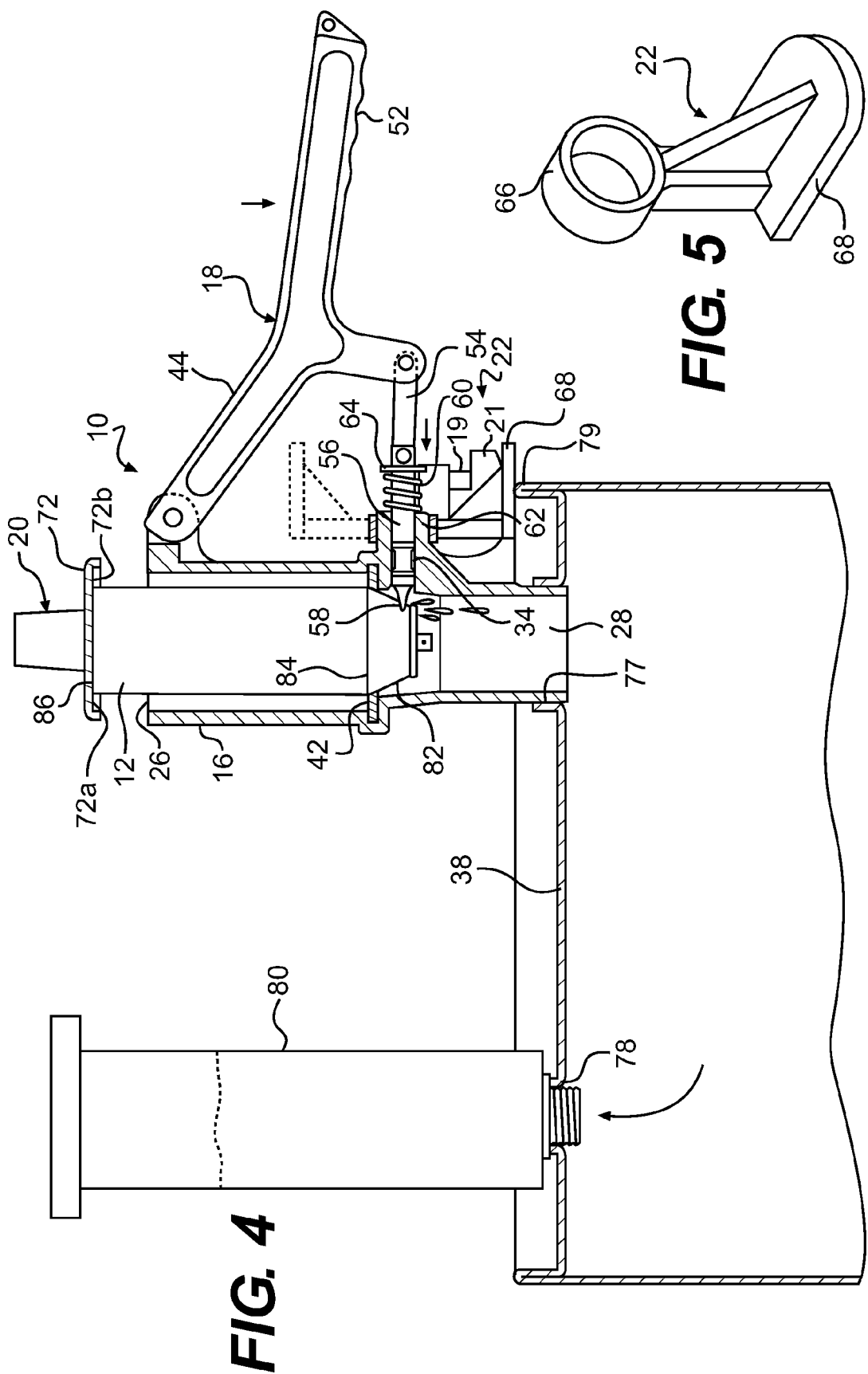

GAS EVACUATION SYSTEM WITH COUNTER

BACKGROUND OF THE INVENTION

1. Field of the Invention

This invention relates generally to the art of waste disposal, and more specifically to devices for relieving aerosol cans of pressure and emptying them of residual contents in preparation for disposing or recycling them.

2. Description of Related Art

This invention has uses in the area of waste disposal, such as in devices and systems for evacuating aerosol cans, and other containers of pressurized gases and residue contents.

Pressurized aerosol cans, and other pressurized containers, have widespread usage in homes and industry. It has long been recognized that improper disposal of such containers constitutes a safety hazard in that excessive external heat and/or pressure can cause them to explode if they have not been relieved of internal pressure. Similarly, the release of contents, both propellant gases and dangerous residue materials, from such containers often damages the environment.

Due to these hazards, the Environmental Protection Agency (EPA), an agency of the U.S. Government, regulates disposal of pressurized containers as well as their contents for industries. These regulations mandate that certain businesses and industries must puncture all pressurized containers prior to their disposal. Further, these regulations require that certain contents of pressurized containers be captured and disposed of in particular manners. Depending upon the natures of such contents, disposal methods can involve permanent disposal through incineration, landfills or other means; treatment and permanent disposal; treatment and recycling; and treatment and reclamation for a new use. An example of reclamation would be recovering a solvent contained in waste paint for use as a fuel. But, whichever disposal method is used, the EPA requires many industries to relieve the pressure in pressurized containers prior to transporting them for disposal.

In addition to the above requirements of the EPA, many states within the United States and countries outside the United States have requirements similar to, or even stricter than, those of the EPA. For example, California closely regulates release of gases into the atmosphere. In this respect, California considers some propellants used in aerosol cans to be contaminants, particularly when they contain small aerosolized particles of materials, such as insecticides, paints and the like, which were in the aerosol cans.

A number of US Patents to Michael Campbell describe systems for evacuating gaseous materials from aerosol containers and other types of containers, see U.S. Pat. Nos. 5,163,585; 5,265,762; and 5,992,475. Most of these systems involve sealing a wall of an aerosol can on a seat, puncturing the can below the seat, and evacuating the contents of the can into a drum.

A widely used device for piercing pressurized containers is described in U.S. Pat. No. 5,265,762 to Campbell et al. This Campbell et al. patent describes a puncturing device for aerosol containers which includes an elongated tubular housing having male threads at a second end for being screwed into a first, or large, bung-plug hole (bunghole) of an off-the-shelf drum, such as a 15, 30 or 55 gallon drum. An aerosol can to be disposed of is inserted into a first opening at a first end of the cylindrical housing, nozzle-end-first, until a shoulder of the aerosol can engages a sealing shoulder seat in the elongated tubular housing. A puncturing member, as part of a mechanism mounted to the side of the housing, is driven through the housing to create a puncture opening in the aerosol can below the sealing shoulder seat. Propelling gas and residue material are driven from the aerosol can, by pressure of the propellant gas, through the puncture opening and through the second end opening of the housing into the drum. The sealing shoulder seat prevents the propellant gas and residue from retro-movement toward the first end opening of the housing (which opens to the environment) and ensures that these materials go into the drum.

Campbell et al (U.S. Pat. No. 5,265,762) also describes a filter screwed into a second, small, bunghole of the drum for filtering propellant gases escaping from the second bunghole of the drum to the environment for cleaning escaping gaseous vapors of atmosphere-harmful materials.

Other patents which describe devices and systems relating to the system described in Campbell et al (U.S. Pat. No. 5,265,762) include U.S. Pat. No. 3,358,883 to Loe; U.S. Pat. No. 3,828,976 to Sidelinker; U.S. Pat. No. 3,926,340 to Tygenhof; U.S. Pat. No. 4,349,054 to Chipman et al; U.S. Pat. No. 4,407,341 to Feldt et al; U.S. Pat. No. 5,114,043 to Collins, Jr.; U.S. Pat. No. 5,181,462 to Isaac; U.S. Pat. No. 5,271,437 to O'Brien et al; U.S. Pat. No. 5,284,997 to Spearman et al; U.S. Pat. No. 5,309,956 to Hajma; U.S. Pat. No. 5,365,982 to O'Neill; and U.S. Pat. No. 6,422,273 to Campbell.

U.S. Pat. No. 5,992,475 to Campbell discloses a spring-activated check valve at the second end of the tubular wall of the housing with a spring-activated valve poppet positioned at the second end for opening and closing in response to pressure. Basically this check valve opens to allow propellant gases to escape from the punctured aerosol cans into the drum and then closes to prevent retrograde movement of the gases from the drum back through the piercing-device housing once the cans are removed. U.S. Pat. No. 5,181,462 to Issac also describes a similar valve.

It is an object of the invention to provide a device for puncturing a pressurized container to relieve the pressure therein and for releasing gases and residual contents thereof into a collection receptacle which is not unduly complicated, which can be easily transported to a site and installed thereat, which is relatively easy and convenient to use requiring no outside power, which can be used with off-the-shelf receptacles in common us, which is relatively inexpensive to manufacture, which operates in a manner complying with EPA regulations in a safe and efficient manner, and which can accommodate pressurized containers of various sizes.

It is another object of the invention to provide a device for puncturing a pressurized container to relieve the pressure therein which provides a reliable record of the history of usage of the device.

It is yet another object of this invention to render aerosol cans recyclable as scrap metal in safe condition for handling, with no shredded metal shards or sharp protrusions.

Finally, it is an object of the present invention to accomplish the foregoing objectives in a simple and cost effective manner.

The above and further objects, details and advantages of the invention will become apparent from the following detailed description, when read in conjunction with the accompanying drawings.

SUMMARY OF THE INVENTION

The present invention addresses these needs by providing a device for puncturing a pressurized container for relieving the pressure therein and for releasing the residual contents thereof into a drum of a type having an end wall with a surrounding protruding peripheral rim, which includes a generally elongated housing member defining an elongated cavity with openings at first and second ends thereof for receiving a pressurized container at the first end and further including an attachment means for securing the second end of the housing member to the end wall of the drum for collection by the drum of contents expelled from the pressurized container through the second end; a puncturing means mounted on the housing member intermediate the first and second ends for piercing the pressurized container in the elongated cavity whereby gases and residual contents thereof are emptied into the drum through the opening at the second end; a counter means cooperatively engaged with the puncturing means wherein the counter means records each piercing of the pressurized container; and the device further including an auxiliary support means for extending from the housing member to the protruding peripheral rim of the drum for stabilizing relative movement between the housing member and the drum during operation of the device. The attachment means is preferably a threaded terminus of the elongated housing member for engaging threads of the end wall of the drum. The auxiliary support means is preferably rotatable on the elongated housing member. The counter means may preferably be reset to its initial counter setting and is preferably enclosed within a housing such that a portion of the counter means remains visible. The device preferably further includes a force-applying means movably mounted on the housing member for engaging the pressurized container positioned in the elongated cavity and forcing the pressurized container towards the second end. The puncturing means preferably comprises a puncturing pin extending into an intermediate housing aperture, the pin including a spring for urging the pin out of the elongated cavity and a lever, pivotally mounted on the outside of the housing member, which is coupled to the pin via a pivoted link, for driving the pin into the elongated cavity. An alternate embodiment of the invention is a device for puncturing a pressurized container for relieving the pressure therein and for releasing the gases and residual contents thereof into a collection receptacle, the device comprising a generally elongated housing member defining an elongated cavity with openings at first and second ends thereof for receiving a pressurized container at the first end and further including an attachment means for securing the second end of the housing member to the receptacle for collecting contents expelled from the pressurized container through the second end; a puncturing means mounted on the housing member intermediate the first and second ends for piercing the pressurized container whereby gases and residual contents thereof are emptied into the collection receptacle through the opening at the second end; a counter means cooperatively engaged with the puncturing means wherein the counter means records each piercing of the pressurized container; and the device further comprising a force-applying means movably mounted on the housing member for engaging the pressurized container positioned in the elongated cavity and forcing the pressurized container towards the second end, wherein the force-applying means comprises a plate affixed to a shaft which is slidably mounted on the housing member. The shaft preferably binds relative to the housing member in response to a force by the pressurized container against the plate, thereby resisting movement of the plate relative to the housing member. The device preferably further includes a set-screw on the housing member for selectively engaging the shaft for holding the plate in a desired position. A pointed tip of the puncturing means is preferably of a non-sparking metal. A portion of the puncturing means preferably extends through an intermediate housing aperture having a seal mounted thereon for forming a seal with a portion of the elongated housing member defining the intermediate aperture. A further alternate embodiment of the present invention is a device for puncturing a pressurized container for relieving the pressure therein and for releasing for collection in a receptacle, residual contents thereof, the improvement wherein the device comprises a generally elongated housing member defining an elongated cavity with openings at first and second ends thereof for receiving a pressurized container therein at the first end and further including an attachment means for selectively securing the second end of the housing member to a receptacle for collecting contents expelled from the second end and for supporting the housing; a puncturing means mounted on the housing member intermediate the first and second ends for piercing the pressurized container in the cavity whereby gases and residual contents thereof are emptied into the collection receptacle through the opening at the second end; a counter means cooperatively engaged with the puncturing means wherein the counter means records each piercing of the pressurized container; and wherein the housing member defines an internal shoulder within the elongated cavity between the puncturing means and the first end whereby the pressurized container can be inserted into the first end in an inverted attitude with an external shoulder thereof engaging the internal shoulder, with a portion thereof extending below the shoulder means to be punctured by the puncturing means. A resilient seal is preferably included at the internal shoulder. The attachment means preferably comprises male threads at the second end of the elongated housing member for engaging standard threaded openings of storage drums. The housing member preferably has an intermediate aperture into the elongated cavity intermediate the first and second ends and wherein the puncturing means is movably mounted on the housing member for extending through the aperture and piercing the pressurized container below the shoulder means.

BRIEF DESCRIPTION OF THE DRAWINGS

A more complete description of the subject matter of the present invention and the advantages thereof, can be achieved by reference to the following detailed description by which reference is made to the accompanying drawings in which:

FIG. 4 is a side, partially cross-sectional view of the device of FIG. 1 mounted on an off-the-shelf-barrel or drum with a filtered outlet;

FIG. 5 is an isometric view of an auxiliary support member which is part of the device of FIG. 1;

DETAILED DESCRIPTION OF THE PREFERRED EMBODIMENT

Figure 1:
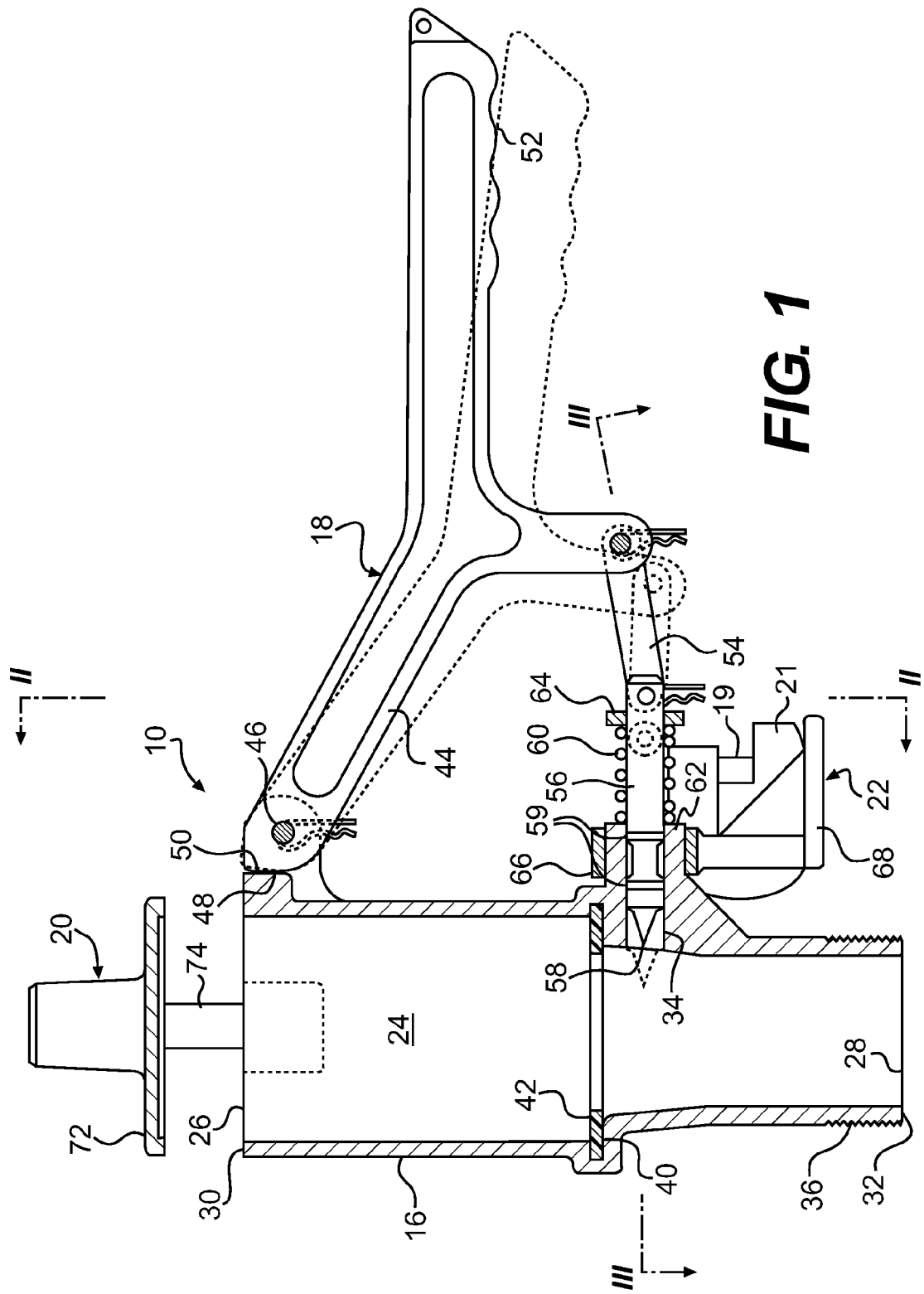
FIG. 1 is a side, partially cross-sectional, view of a first-embodiment device of this invention.

The following detailed description is of the best presently contemplated mode of carrying out the invention. This description is not to be taken in a limiting sense, but is made merely for the purpose of illustrating general principles of embodiments of the invention. The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

Generally, the invention is a device for puncturing a pressurized container for relieving the pressure therein and for releasing the gases and residual contents thereof into a collection receptacle which comprises an elongated housing member defining an elongated cavity with first and second openings at first and second ends thereof for receiving an inverted pressurized container in the first opening, the housing member having an intermediate aperture into the elongated cavity intermediate the first and second ends, the housing member including an attachment member for securing the second end of the housing member to a receptacle for collecting contents expelled from the second end when a puncturing member, which is movably mounted on the housing member and which is cooperatively engaged with a counter, extends through the intermediate aperture and pierces a pressurized container in the cavity. The counter acts to record the actions of the puncturing member. The housing member defines an internal shoulder between the first end and the intermediate aperture for engaging the pressurized container with an inverted nozzle-end thereof extending beyond the shoulder being pierced by the puncturing apparatus, the nozzle-end forming a funnel shape to thereafter maximize evacuation of residual liquids. A seal is included on the shoulder for forming a seal between the housing member and the pressurized container. An auxiliary support member extends from the housing member to the receptacle for preventing relative movement between the housing member and the receptacle during operation of the device.

Figure 7:
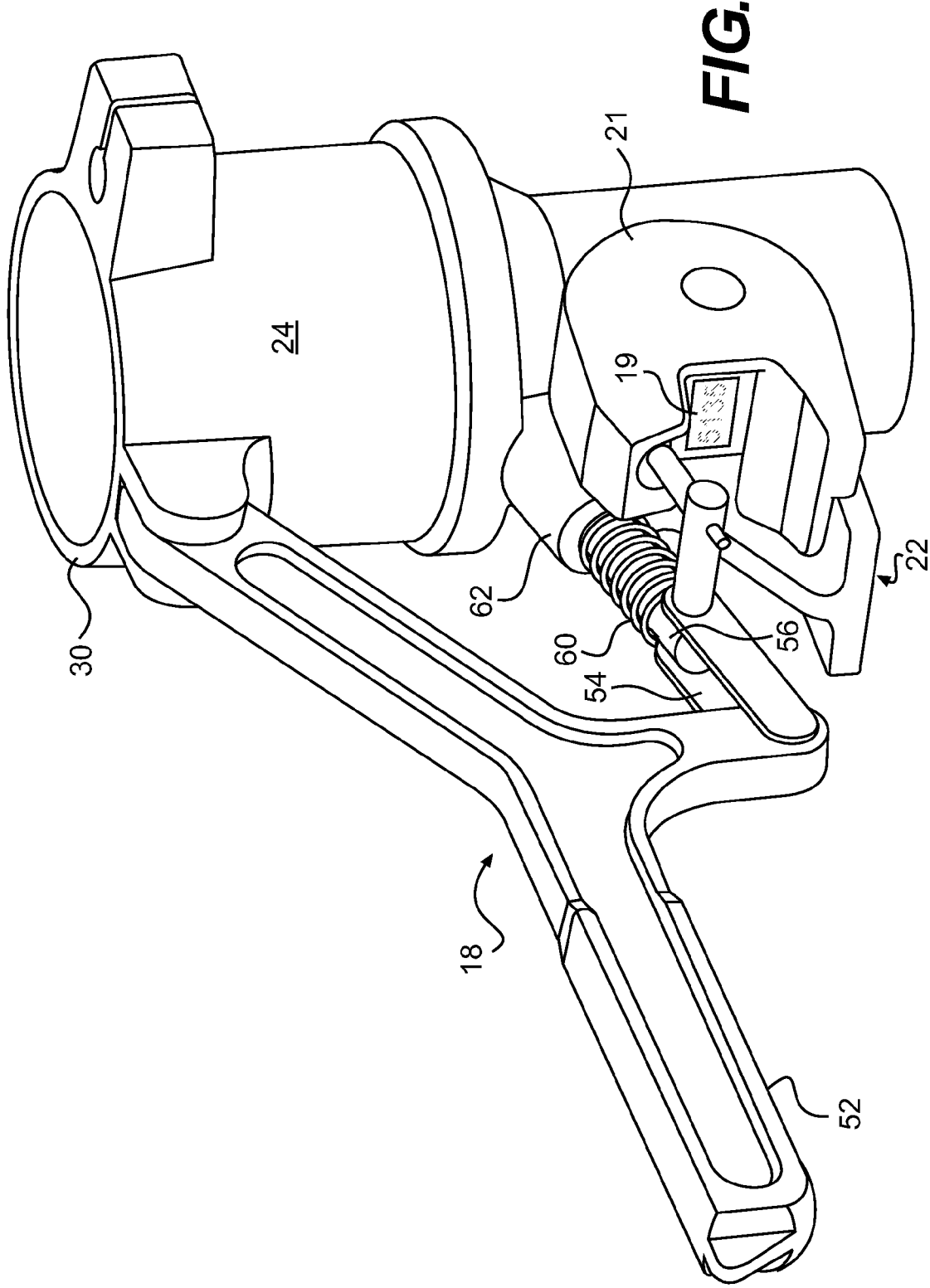
FIG. 7 is a perspective view of the preferred embodiment of this invention.

As shown generally in FIG. 7, a device 10 for puncturing a pressurized container 12 for relieving the pressure therein and for releasing into a collection container or receptacle the gases and residual contents thereof generally comprises an elongated housing member 16, puncturing apparatus 18, counter 19, force-applying apparatus 20, and an auxiliary support member 22.

The generally elongated housing member 16 defines an elongated cavity 24 with first and second openings 26 and 28 at first and second ends 30 and 32 thereof. The elongated housing member 16 has an intermediate aperture 34 extending from outside the elongated housing member 16 into the elongated cavity 24 positioned intermediate the first and second open ends 30 and 32. The elongated housing member further includes a threaded terminus 36, with male threads thereon near the second end 32 which is dimensioned, and which has a thread pitch, for selectively engaging and disengaging a female threaded bung of a standard off-the-shelf 5 gal., 20 gal., 30 gal., 55 gal. drum 38 and others (although other embodiments can be sized and threaded to fit other collection containers or receptacles). In this regard, the standard off-the-shelf drums mentioned above all have 2 inch filling or spout bung holes with standard threads as well as ¾ inch venting bung holes, also with standard threads. Similarly, drums meeting standards of other countries also usually have large and small threaded bung holes.

As can be seen in FIG. 1, the elongated housing member 16 defines an internal shoulder 40 therein immediately above the intermediate aperture 34, between the intermediate aperture 34 and the first end 30, such that the elongated cavity 24 has a relatively uniform cross-sectional area (about 2⅞ inch in diameter in one embodiment) from the first end 30 to the shoulder 40 but thereafter has a reduced cross-sectional area (about 1¾ inch diameter in one embodiment). A resilient seal 42 is positioned on the shoulder 40 for sealing against pressurized cans inverted and inserted into the elongated cavity from the first end 30.

The puncturing apparatus 18 comprises a pivotal, angular lever 44 which is pivotally mounted to the elongated housing member 16 near the first end 30 thereof by a pivot pin 46. In this regard, the lever 44 has a lever stop surface 48 thereon which impinges on a housing member stop surface 50 to prevent the lever 44 from pivoting about the pivot pin 46 outwardly, away from the housing member 16, further than a particular angle. The lever 44 has a grip 52 at an outer end thereof with which an operator can rotate the lever 44 about the pivot pin 46. A pivoted link 54, comprised of to parallel slats, is pivotally coupled to the lever 44 at one end and to a puncture pin 56 at the other end. A free end of the puncture pin 56 has a pointed tip 58 and slides in the intermediate aperture 34. A pair of O-rings 59 on the puncture pin provides a seal between the intermediate aperture 34 and the puncture pin 56. An area of the pin between the O-rings is cut out and greased to provide self lubricating with each stroke of the puncture pin. A coiled spring 60 surrounding the puncture pin 56, externally of the housing member 16, presses between a tubular protrusion 62 of the elongated housing member 16 and a stop 64 of the puncture pin 56, thereby urging the puncture pin 56 outwardly, so as to be withdrawn from the elongated cavity 24. The particular angle at which stop surfaces 48 and 50 prevent the lever 44 from further outward pivoting is such that the O-ring seal area of the puncture pin 56 remains in the intermediate aperture when the lever is stopped at this angle. By rotating the lever 44 downwardly the coiled spring 60 can be overcome and the puncture pin 56 can be driven into the elongated cavity 24. As can be seen in FIG. 1, the tubular protrusion 62 surrounds the intermediate aperture 34.

Cooperatively engaged with the puncturing apparatus 18 is the counter 19. The counter 19 cooperates with the puncturing apparatus 18 such that with each puncture made by the puncturing apparatus 18, the counter 19 records such puncture. For example, a pressurized container 12 which is "spent" is typically 25% full, requiring one action of the puncturing apparatus 18 while a pressurized container 12 which is "full" requires four actions of the puncturing apparatus 18. It is critical to record each action of the puncturing apparatus 18 as certain elements of the device 10, such as the filter 80 (described below), require replacement after a specific number of punctures. Additionally, maintenance must be performed on the device 10 after a specific number of actions of the puncturing apparatus 18. The counter 19 may preferably be capable of being reset to facilitate the recordal of puncturing actions. In a further preferred embodiment, the counter 19 is enclosed in a housing 21 to prevent accidentally or unintentionally resetting the counter 19.

Figure 2:
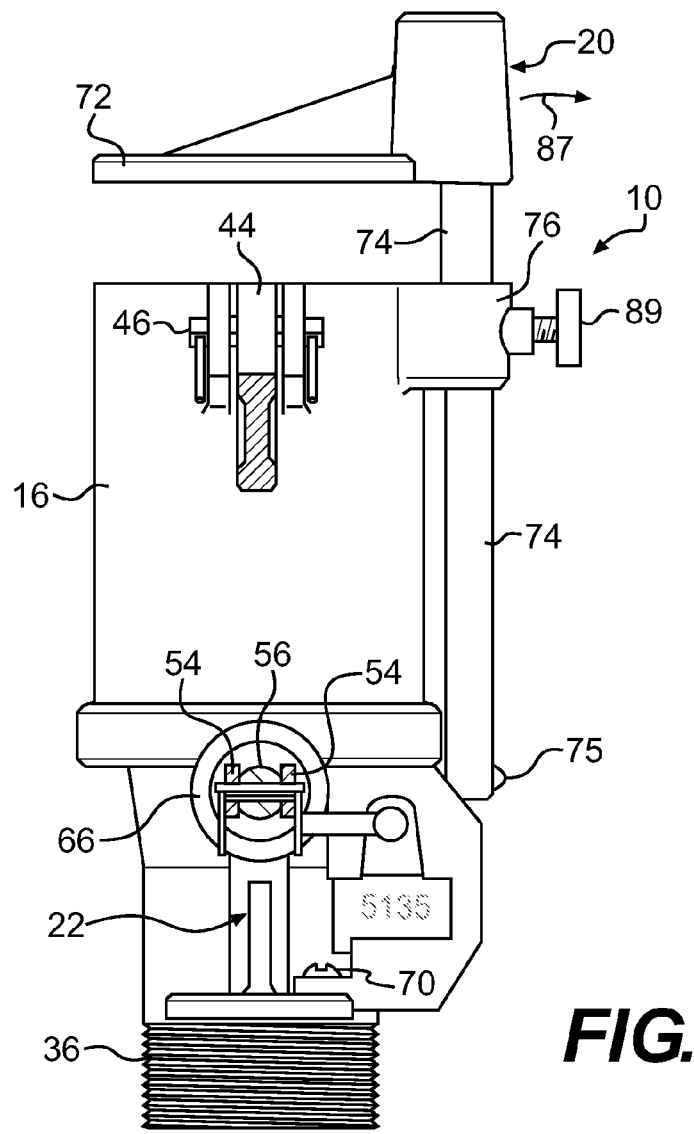
FIG. 2 is a sectional view taken on line II-II in FIG. 1.
Figure 3:
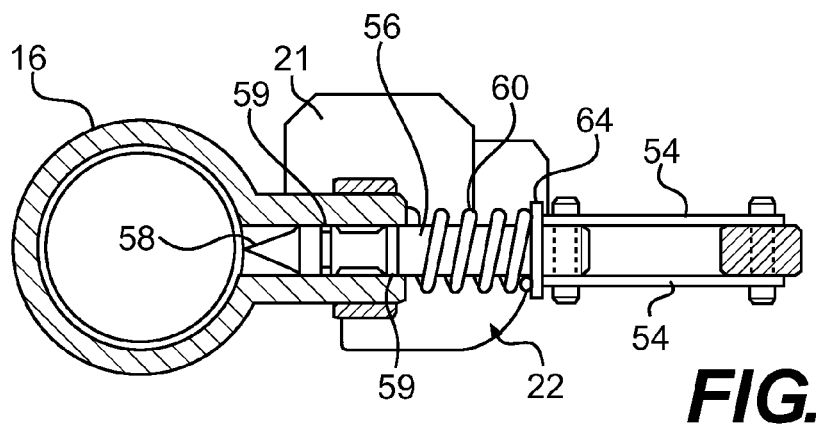
FIG. 3 is a sectional view taken on line III-III in FIG. 1.

The auxiliary support member 22 has a sleeve 66, which snugly surrounds the protrusion 62 to be easily rotatable thereabout, and a foot 68. The auxiliary support member includes a grounding screw 70 (FIG. 2) to which an electrical wire can be attached. It should be noted that the foot 68 is spaced immediately adjacent, or just a little above, the threads of the threaded terminus 36 of the elongated housing member 16 when the auxiliary support member is rotated so that the foot 68 thereof is directed toward the second end 32.

The force-applying apparatus 20 comprises a plate 72 which is affixed to a shaft 74 which, in turn, is slidably mounted in a sleeve 76 formed on the outside of the elongated housing member 16. Thus, the plate 72 can be rotated into and out of alignment with the first opening 26 of the elongated housing member 16 as well as moved toward and away from the first opening 26. The shaft 74 has a stop 75 thereon to prevent its removal from the sleeve 76. The plate 72 has an indentation 72a thereon with a flat floor surface 72b for receiving the bottoms of inverted pressurized containers.

The device 10 can be constructed of various materials, however, in a preferred embodiment, the housing member 16, the lever 44, the plate 72 and the auxiliary support member 22 are formed of aluminum so that they are light in weight, with the seal 42 and O-ring 59 being of elastomeric materials. In a preferred embodiment, the puncture pin 56, the pivoted link 54, the pivot pins and clips are of stainless steel. Also, in a preferred embodiment the pointed tip 58 of the puncture pin 56 is of carbide steel or of some other non-sparking alloy, to prevent sparking and thereby promote safety.

In operation, the device 10 is mounted on a common off-the-shelf drum 38 (typically a 55 gal. or 30 gal. drum) by screwing the threaded terminus 36 of the elongated housing member 16 into the normal female threaded, 2 inch, filling bung opening 77 of the drum.

While screwing the threaded terminus 36 into the drum, the auxiliary support member, 22 is rotated upwardly about the tubular protrusion 62 to be out of the way so as to cause the least amount of wear on the bung threads of the drum as is depicted in dashed lines in FIG. 4. The auxiliary support member 22 is only rotated downwardly on the final rotation of installation such that the foot 68 impinges on a protruding peripheral rim 79 of the drum. Thus, the auxiliary support member 22 is wedged between the rim 79 of the drum and the tubular protrusion 62 of the housing member 16.

A filter 80, which can be part of a kit including the puncturing device, is mounted in the normal ¾ inch vent opening 78 of the drum 38 for filtering escaping propellent gases and collecting gaseous vapors thereof.

The plate 72 of the force-applying apparatus 20 is lifted and rotated away from the first opening 26 and a pressurized container 12 is inverted and a dome, or neck, 82 thereof is inserted into the first opening 26. A shoulder 84 of the neck 82 comes into contact with the seal 42 on the shoulder 40 of the elongated housing member 16 and forms a seal therewith. The plate 72 is rotated above the first opening 26 and slid to impinge on an upwardly-facing bottom 86 of the pressurized container 12 to thereby force the shoulder 84 of the container 12 against the seal 42 of the elongated housing member 16 and thereby form a seal between these two members. The plate 72, which can be made of a heavier weight material, maintains this position, because upward force applied thereto tends to rotate the shaft 74 in a direction indicated by arrow 87 (FIG. 2) which binds it in the sleeve 76. In addition, in one embodiment the sleeve 76 has a threaded set-screw hole therein for receiving a knobbed set-screw 89 to impinge on the shaft 74. When the set-screw 89 is tightened it holds the plate 72 even more firmly in a fixed position. Finally, many operators prefer to simply hold the plate 72 against a can by hand, because this is the quickest method of operation. The plate 72 flattens on a bottom surface of the pressurized container 12, thereby straightening the container 12 so that a good seal is formed between the seal 42 and the container's neck 82.

Thereafter, the grip 52 of the lever 44 is manipulated to rotate the lever 44 downwardly toward the elongated housing member 16 thereby driving the puncture pin 56 through the intermediate aperture 34 into the dome, or neck, 82 of the pressurized container 12. Pressure in the thusly punctured pressurized container 12 forces gases and residue material from the container through the second opening 28 into the drum 38 to which the elongated housing member 16 is screwed. Propellants and other gases escape through the filter 80 and are thereby filtered, with gaseous vapors being collected.

Figure 6:
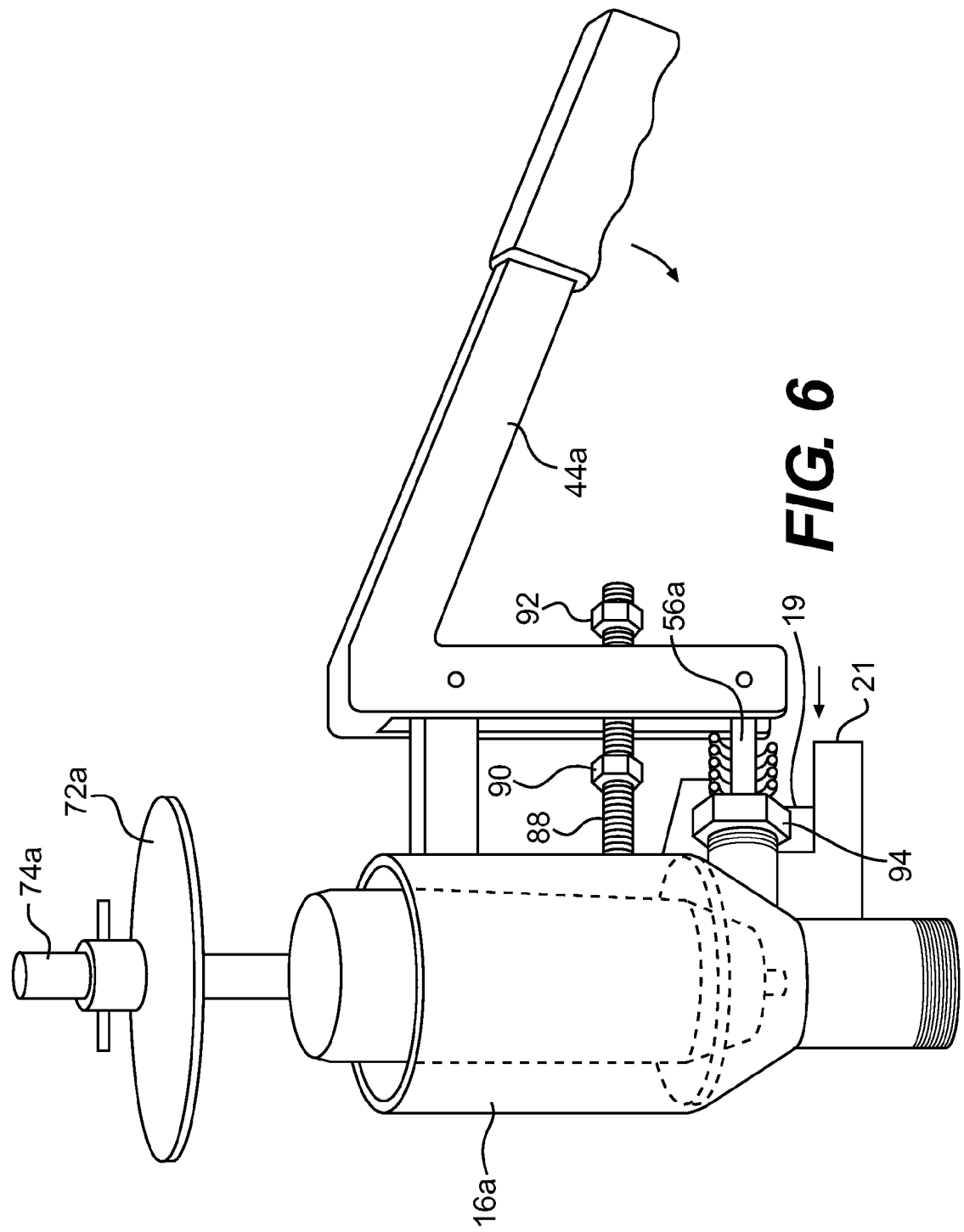
FIG. 6 is an isometric view of an alternate embodiment of this invention.

FIG. 6 discloses an alternate embodiment of this invention in which a lever 44a is shaped and mounted quite differently than described above to an elongated housing member 16a. In this regard, a separate stop threaded bolt 88 is attached to the elongated housing member 16a with nuts 90 and 92 thereon to form stops. In this embodiment, the pivoted link 54 is not needed. Further, in this embodiment, there is no auxiliary support member 22. A plate 72a is not affixed to a shaft 74a, but rather is slidably connected thereon and the shaft 74a is affixed to the elongated housing member 16a. In this embodiment, a puncture pin 56a does not have an O-ring mounted thereon, but rather packing material is held about the puncture pin in a tubular protrusion 62a by a screwed-in plug 94. Otherwise, the embodiment of FIG. 6 operates substantially the same as does the embodiment of FIGS. 1-5.

It can be appreciated by those of ordinary skill in the art that the device for puncturing a pressurized container of this invention does not require a power source and can be located indoors or outdoors with no consideration for access to electricity or other power sources.

Also, the device of this invention can be directly attached to existing off-the-shelf collection containers or receptacles for collection of residual contents. That is, since the threaded terminus of the elongated housing member is sized to engage bung threads of typical storage drums, the invention can be easily transported without consideration for transporting large containers and can be inexpensively manufactured. It should be understood that although the device has been described herein to be mounted on drums standard in the United States, it could be sized to drum standards in any country.

Yet another benefit of this invention is that it accommodates most sizes of aerosol cans. Regardless of can diameters or lengths, the internal support shoulder of the elongated housing member is positioned and sized such that each inverted dome of an aerosol can is punctured at exactly the same spot as those of other cans. Conversely, this invention cannot be used to puncture a can with its nozzle-end, or dome-end, up. This is a safety feature, because the flat bottom of a container does not maximize evacuation of liquid residuals as does the funnel-shaped dome-end.

It is beneficial, however, that, although an aerosol can is punctured at its downwardly-facing nozzle-end, it is punctured from the side rather than from the end. This also enhances safety, because any force from released, compressed gas moves the can against an opposite side of the housing member rather than upwardly. This is important for protecting an operator who might forget to properly place the plate 72.

This invention is portable, lightweight and inexpensive, all features which facilitate compliance with regulations within a manufacturing plant. That is, the invention can be located at each "work center" at the convenience of workers, rather than in one centralized location which is where a large expensive machine would typically be located. That is, if a facility employs expensive machines, it is not economical to have many such machines spread out through the facility. However, manufacturing facilities have, in addition to their normal production line, maintenance shops where many aerosol cans are used, such as pump shops, machine shops, electrical shops, HVAC shops, maintenance shops etc.

Not only does this invention allow pressurized cans to be brought to "atmospheric pressure" prior to disposal, it also increases opportunities for recycling the cans. That is, aerosol cans which often contain chemicals will not be accepted by recyclers unless relieved of pressure. The 3 billion aerosol cans annually used in the US today amount to 375,000 tons of steel.

The lever operation of the device of this invention allows workers to easily puncture cans without endangering themselves, since compressed fluids are maintained in sealed portions of the elongated housing member, and workers are not in direct contact with the cans when they are punctured.

This invention facilitates the filtering of gases released from aerosol cans since filters can be relatively easily mounted to vent bung ports of standard drums.

Further, the device of this invention can be easily disassembled for required maintenance such as replacing pins or seals.

The auxiliary support member of this invention improves its operation by dissipating downwardly applied forces to a rim of the receptacle, which is usually the strongest part of the receptacle. Thus, the auxiliary support member protects an area around a bung opening of a drum. Further, because the rim height relative to the bung varies slightly from one receptacle to another, the auxiliary support member can be rotated downwardly against the rim at different revolutions of the elongated housing member during installation, a rounded rim of the foot providing contact for an additional half turn of the elongated housing member for adjustment.

Further, the auxiliary support member facilitates the electrical grounding of a drum, which is required by some governmental agencies, to prevent build-up of static electricity. By providing a grounding screw on the auxiliary support member, such grounding can be easily accomplished.

Since the auxiliary support member is rotatable about the tubular protrusion surrounding the intermediate aperture, it does not get in the way during mounting of the elongated housing member on the drum and it can be easily installed during the last rotation of the elongated housing member. The auxiliary support member ensures that relatively little stress is applied against the collection receptacle's threaded opening while allowing adjustment to different rim heights.

By placing O-rings in grooves of the puncture pin, fluid-tightness can be achieved with little effort. The recessed area between O-rings can be lubricated with grease so that the puncture pin is self-lubricated during use.

Obviously, many modifications may be made without departing from the basic spirit of the present invention. Accordingly, it will be appreciated by those skilled in the art that within the scope of the appended claims, the invention may be practiced other than has been specifically described herein. Many improvements, modifications, and additions will be apparent to the skilled artisan without departing from the spirit and scope of the present invention as described herein and defined in the following claims.

What is claimed is:

1. A device for puncturing a pressurized container for relieving the pressure therein and for releasing the residual contents thereof into a drum of a type having an end wall with a surrounding protruding peripheral rim, said device comprising:
   a generally elongated housing member defining an elongated cavity with openings at first and second ends thereof for receiving a pressurized container at said first end and further including an attachment means for securing said second end of said housing member to said end wall of said drum for collection by said drum of contents expelled from said pressurized container through said second end;
   a puncturing means mounted on said housing member intermediate said first and second ends for piercing said pressurized container in said elongated cavity whereby gases and residual contents thereof are emptied into said drum through said opening at said second end;
   a counter means cooperatively engaged with said puncturing means wherein said counter means records each piercing of said pressurized container by an increasing count such that at a plurality of preselected counts prior to a preselected maximum count and without resetting the counter, at least one maintenance activity is indicated as due and such that at preselected additional increasing counts an additional maintenance activity is indicated as due;
   said device further including an auxiliary support means for extending from said housing member to said protruding peripheral rim of said drum for stabilizing relative movement between said housing member and said drum during operation of said device.

2. A device as in claim 1 wherein said attachment means is a threaded terminus of said elongated housing member for engaging threads of said end wall of said drum.

3. A device as in claim 2 wherein said auxiliary support means is rotatable on said elongated housing member.

4. A device as in claim 1 wherein said counter means may be reset to its initial counter setting.

5. A device as in claim 1 wherein the counter means is enclosed within a housing such that a portion of the counter means remains visible.

6. A device as in claim 1 wherein is further included a force-applying means movably mounted on said housing member for engaging said pressurized container positioned in said elongated cavity and forcing said pressurized container towards said second end.

7. A device as in claim 1 wherein said puncturing means comprises a puncturing pin extending into an intermediate housing aperture, said pin including a spring for urging said pin out of said elongated cavity and a lever, pivotally mounted on the outside of said housing member, which is coupled to said pin via a pivoted link, for driving said pin into said elongated cavity.

8. A device for puncturing a pressurized container for relieving the pressure therein and for releasing the gases and residual contents thereof into a collection receptacle, said device comprising:
- a generally elongated housing member defining an elongated cavity with openings at first and second ends thereof for receiving a pressurized container at said first end and further including an attachment means for securing said second end of said housing member to said receptacle for collecting contents expelled from said pressurized container through said second end;
- a puncturing means mounted on said housing member intermediate said first and second ends for piercing said pressurized container whereby gases and residual contents thereof are emptied into said collection receptacle through said opening at said second end;
- a counter means cooperatively engaged with said puncturing means wherein said counter means records each piercing of said pressurized container by an increasing count such that at a plurality of preselected counts prior to a preselected maximum count and without resetting the counter, at least one maintenance activity is indicated as due and such that at preselected additional increasing counts an additional maintenance activity is indicated as due;
- said device further comprising a force-applying means movably mounted on said housing member for engaging said pressurized container positioned in said elongated cavity and forcing said pressurized container towards said second end, wherein said force-applying means comprises a plate affixed to a shaft which is slidably mounted on said housing member.

9. A device as in claim 8 wherein said shaft binds relative to said housing member in response to a force by said pressurized container against said plate, thereby resisting movement of said plate relative to said housing member.

10. A device as in claim 8 wherein is further included a set-screw on said housing member for selectively engaging said shaft for holding said plate in a desired position.

11. A device as in claim 8 wherein a pointed tip of said puncturing means is of a non-sparking metal.

12. A device as in claim 8 wherein a portion of said puncturing means extends through an intermediate housing aperture having a seal mounted thereon for forming a seal with a portion of said elongated housing member defining said intermediate aperture.

13. A device as in claim 8 wherein said counter means may be reset to its initial counter setting.

14. A device as in claim 8 wherein the counter means is enclosed within a housing such that a portion of the counter means remains visible.

15. In a device for puncturing a pressurized container for relieving the pressure therein and for releasing for collection in a receptacle, residual contents thereof, the improvement wherein:
- said device comprises a generally elongated housing member defining an elongated cavity with openings at first and second ends thereof for receiving a pressurized container therein at said first end and further including an attachment means for selectively securing said second end of said housing member to a receptacle for collecting contents expelled from said second end and for supporting said housing;
- a puncturing means mounted on said housing member intermediate said first and second ends for piercing said pressurized container in said cavity whereby gases and residual contents thereof are emptied into said collection receptacle through said opening at said second end;
- a counter means cooperatively engaged with said puncturing means wherein said counter means records each piercing of said pressurized container by an increasing count such that at a plurality of preselected counts prior to a preselected maximum count and without resetting the counter, at least one maintenance activity is indicated as due and such that at preselected additional increasing counts an additional maintenance activity is indicated as due; and
- wherein said housing member defines an internal shoulder within said elongated cavity between said puncturing means and said first end whereby said pressurized container can be inserted into said first end in an inverted attitude with an external shoulder thereof engaging said internal shoulder, with a portion thereof extending below said shoulder means to be punctured by said puncturing means.

16. A device as in claim 15 wherein a resilient seal is included at said internal shoulder.

17. A device as in claim 15 wherein the attachment means comprises male threads at said second end of said elongated housing member for engaging standard threaded openings of storage drums.

18. A device as in claim 15 wherein said housing member has an intermediate aperture into said elongated cavity intermediate said first and second ends and wherein said puncturing means is movably mounted on said housing member for extending through said aperture and piercing said pressurized container below said shoulder means.

19. A device as in claim 15 wherein said counter means may be reset to its initial counter setting.

20. A device as in claim 15 wherein the counter means is enclosed within a housing such that a portion of the counter means remains visible.

* * * * *